(12) United States Patent
Homma et al.

(10) Patent No.: US 6,226,461 B1
(45) Date of Patent: May 1, 2001

(54) MACROMOLECULAR LIQUID CRYSTAL ELEMENT USED IN A DIFFUSION PLATE

(75) Inventors: Itaru Homma, Tokyo; Toru Iwane, Kanagawa, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/314,881

(22) Filed: May 19, 1999

(30) Foreign Application Priority Data

May 21, 1998 (JP) .................................................. 10-155426

(51) Int. Cl.$^7$ .......................... G03B 13/24; G02F 1/1333
(52) U.S. Cl. ............................................... 396/150; 349/84
(58) Field of Search .................................... 396/150, 152, 396/457; 349/160, 158, 112, 84

(56) References Cited

U.S. PATENT DOCUMENTS

| | | | |
|---|---|---|---|
| 4,208,115 | * | 6/1980 | Proske ................................... 396/152 |
| 4,441,798 | * | 4/1984 | Watanabe et al. .................... 396/150 |
| 5,539,548 | * | 7/1996 | Yamazaki et al. ................ 359/158 X |

* cited by examiner

*Primary Examiner*—W. B. Perkey

(57) ABSTRACT

A liquid crystal element which can regulate diffusivity simply. The liquid crystal element includes a diffusion plate having a macromolecular dispersion type liquid crystal interposed between a first glass plate and a second glass plate. The surface of the first glass plate toward the macromolecular dispersion type liquid crystal has random roughness, and a transparent electrode layer is formed on the roughened surface of the first glass plate. Moreover, a surface of the second glass plate toward the macromolecular dispersion type liquid crystal is a flat surface, and a transparent electrode layer is formed directly on the flat surface of the second glass plate. When not being driven, light which is incident perpendicularly on the plate surface from below the diffusion plate passes through the second glass plate, is scattered, and is incident on the macromolecular dispersion type liquid crystal. Moreover, when light which passes through the macromolecular dispersion type liquid crystal is incident on the first glass plate, diffusion arises corresponding to the configuration of roughness as a result of refraction. Accordingly, when the blurring angle with respect to the incident light is large, the diffusion coefficient can be made about zero, and the diffusing characteristics of the diffusion plate can be made suitable.

20 Claims, 3 Drawing Sheets

MACROMOLECULAR LIQUID CRYSTAL ELEMENT USED IN A DIFFUSION PLATE

CROSS-REFERENCE TO RELATED APPLICATIONS

This application is based upon and claims priority of Japanese Patent Application No. 10-155426 filed May 21, 1998, the contents being incorporated herein by reference.

BACKGROUND OF THE INVENTION

1. Field of the Invention

The present invention relates to macromolecular type liquid crystal elements used in a diffusion plate of a camera and the like. More particularly, the present invention relates to a liquid crystal element which can control diffusivity with a low driving voltage.

2. Description of the Related Art

Conventionally, macromolecular liquid crystal elements are incorporated into a structure in which a macromolecular dispersion type liquid crystal is interposed between transparent electrodes, such as indium tin oxide or the like, disposed on the surfaces of two (2) flat transparent plates. The diffusivity in the known macromolecular dispersion type liquid crystal element is regulated by changing between a diffusing state and a transparent state by controlling an alternating voltage or the like applied between the transparent electrodes.

However, when the diffusivity of the prior art macromolecular dispersion type liquid crystal element is increased in the above-described manner, the film thickness of the macromolecular dispersion type liquid crystal layer must be thick. When the film thickness is made thick, the spacing of the transparent electrodes becomes wide, and the driving voltage becomes high.

Moreover, the known macromolecular dispersion type liquid crystal element diffuses light to some degree even when a voltage is applied. Therefore, when the film thickness of the liquid crystal layer is made thick, the optical transmissivity in the transparent state becomes poor, and the contrast between the diffusion state and the transparent state falls off.

Moreover, when the known macromolecular dispersion type liquid crystal element is applied to the diffusion plate of a camera or the like, it becomes difficult to obtain more diffusivity in the diffusion plate because the diffusivity of this element depends on the properties of the macromolecular dispersion type liquid crystal. More specifically, in prior art diffusion plates, because diffused light remains having a diffusion coefficient which is increased to some extent, a so-called "soft focus" image is obtained such that fogginess faintly surrounds a blurred image, even in a region in which the angle from the normal line is rather large.

FIG. 6 is a graph showing the diffusion coefficient of a prior art type of diffusion plate. The prior art diffusion plate includes a plane parallel plate glass, which is unaltered and has no roughness formed on it, used as a glass plate, and both interfaces with the macromolecular dispersion type liquid crystal are flat. In the prior art diffusion plate, as an angle θ from a normal line to the diffusion plate becomes large, the diffusivity of the diffusion plate gradually becomes small, and diffusivity remains to some degree, even in regions in which the angle θ is quite large. Further, in the prior art type of diffusion plate, when an image projected thereon is indistinct, the so-called "soft focus" image is obtained, with fogginess extending widely around a blurred image.

SUMMARY OF THE INVENTION

It is an object of the present invention to provide a liquid crystal element which can diversely control the diffusivity.

It is another object of the present invention to provide a liquid crystal element which can easily control diffusivity with a low driving voltage.

It is yet another object of the present invention to provide a liquid crystal element having a sufficiently large contrast between the diffusing state and the transparent state.

It is yet another object of the present invention to provide a liquid crystal element which has a diffusivity suitable for diffusion plate.

Objects and advantages of the present invention are achieved in accordance with embodiments of the present invention with a liquid crystal element comprising a macromolecular dispersion type liquid crystal; and transparent plates between which the macromolecular dispersion type liquid crystal is interposed, wherein at least one of the transparent plates has roughness toward the macromolecular dispersion type liquid crystal.

In accordance with embodiments of the present invention, when the refractive index of the liquid crystal comprising the macromolecular dispersion type liquid crystal becomes a value which differs from the refractive index of the macromolecules in a predetermined electric field state, diffusion occurs at the interface of the macromolecules and the liquid crystal. Moreover, dispersion arises corresponding to the configuration of the roughness because of the refractive index of the liquid crystal within the macromolecular dispersion type liquid crystal portions which enter into concave portions of the roughness, even when the value of the refractive index differs because of the changes of a voltage state in the electric field state. Accordingly, the dispersion properties of the liquid crystal element can be diversely regulated.

In accordance with embodiments of the present invention, the refractive index of the transparent plate on which roughness is formed differs from the refractive index of the macromolecules comprising the macromolecular dispersion type liquid crystal. In this case, when the refractive index of the liquid crystal deviates from the refractive index of the macromolecules, the macromolecular dispersion type liquid crystal has diffusion characteristics which are appropriate as a diffusion plate, and can make the diffusion coefficient smaller when the scattering angle of incident light is large.

In accordance with embodiments of the present invention, the refractive index of the transparent plate on which the roughness is formed is approximately equal to the refractive index of the macromolecules comprising the macromolecular dispersion type liquid crystal. In this case, the amplitude of change of the diffusion coefficient becomes large because of the synergistic action of scattering and the diffusion corresponding to the rough configuration in the interface of the macromolecules with the liquid crystal.

Moreover, in accordance with embodiments of the present invention, the macromolecular dispersion type liquid crystal may be a reverse type of macromolecular dispersion type liquid crystal. When the refractive index of the transparent plate on which the roughness is formed differs from the refractive index of the macromolecules comprising the macromolecular dispersion type liquid crystal, the diffusion does not become small and the image surface becomes clear. Therefore, when driving, diffusion arises and focusing becomes possible. Because the non-driving time is normally considerably longer, the electric power consumption of the liquid crystal element can be advantageously reduced. On the other hand, when the refractive index of the transparent plate on which the roughness is formed is approximately equal to the refractive index of the macromolecules comprising the macromolecular dispersion type liquid crystal, the voltage needed to attain a desired diffusion coefficient becomes low, and driving of the liquid crystal element becomes easy.

Objects and advantages of the present invention are achieved in accordance with embodiments of the present invention with a method of forming a liquid crystal element, comprising the steps of preparing a first transparent plate; roughening a surface of the first transparent plate; forming a first transparent electrode on the roughened surface of the first transparent plate; preparing a second transparent plate; forming a transparent electrode on one side of the second transparent plate; inserting a spacer between the first and second transparent plates; injecting a mixture of liquid crystal and monomer into a space between the first and second transparent plates; and exposing the mixture of liquid crystal and monomer to ultraviolet radiation to form a network of macromolecules.

Objects and advantages of the present invention are achieved in accordance with embodiments of the present invention with a camera, comprising a photographic lens to image a subject; a mirror to change a path of the image imaged by the photographic lens; a liquid crystal element to receive the image imaged by the photographic lens, the liquid crystal element including, a macromolecular dispersion type liquid crystal, and transparent plates between which the macromolecular dispersion type liquid crystal is interposed, wherein at least one of the transparent plates has roughness toward the macromolecular dispersion type liquid crystal.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
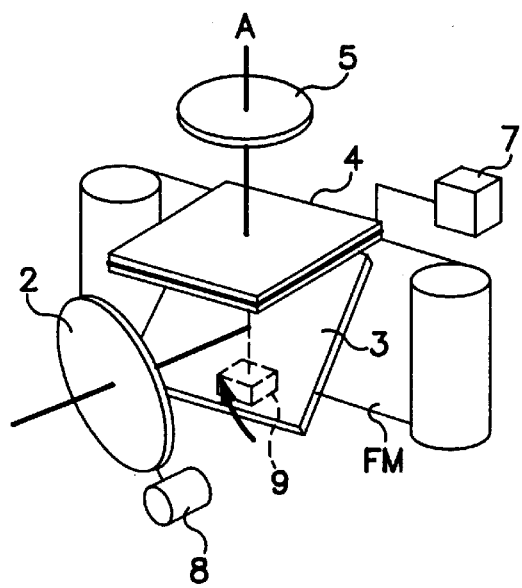
FIG. 1 is a schematic diagram illustrating the structure of a single lens reflex camera including a diffusion plate which is a liquid crystal element in accordance with a first embodiment of the present invention.

Reference will now be made in detail to the preferred embodiments of the present invention, examples of which are illustrated in the accompanying drawings, wherein like reference numerals refer to like elements throughout.

First Preferred Embodiment

FIG. 1 is a schematic diagram illustrating the structure of a single lens reflex camera including a diffusion plate which is a liquid crystal element in accordance with a first embodiment of the present invention.

As shown in FIG. 1, the single lens reflex camera includes a photographic lens 2 for imaging the image of a subject on a film FM, a spring-up type of partially transparent reflecting mirror 3 to change the light path of the light from the photographic lens 2, a diffusion plate 4 located in a conjugate surface to the film FM, and a loupe 5 to observe the image projected on the diffusion plate 4.

Moreover, a mirror (omitted from the drawing) is disposed on the back surface of the partially transparent reflecting mirror 3 and passes light which has passed through the partially transparent reflecting mirror 3, downward to an autofocus (AF) detection unit 9.

The diffusion plate 4 comprises a macromolecular dispersion type liquid crystal which changes its diffusivity under the control of a voltage output by a driver circuit 7. For example, during AF operation, when operating a lens driving device 8 based on the focus detection signal from the autofocus detection unit AF, the photographic lens 2 is moved to a focused position, making the diffusion plate 4 rather transparent and thereby making the picture surface clear. Moreover, during manual operation, when the photographic lens 2 is moved to a focused position by manual operation, the diffusivity of the diffusion plate 4 remains high, the depth of field is shallow, and it is easy to detect the peak of focus. Furthermore, during AF operation, the depth of field at the aperture value can be artificially represented by adjusting the diffusivity of the diffusion plate 4 to correspond to the aperture value.

Figure 2:
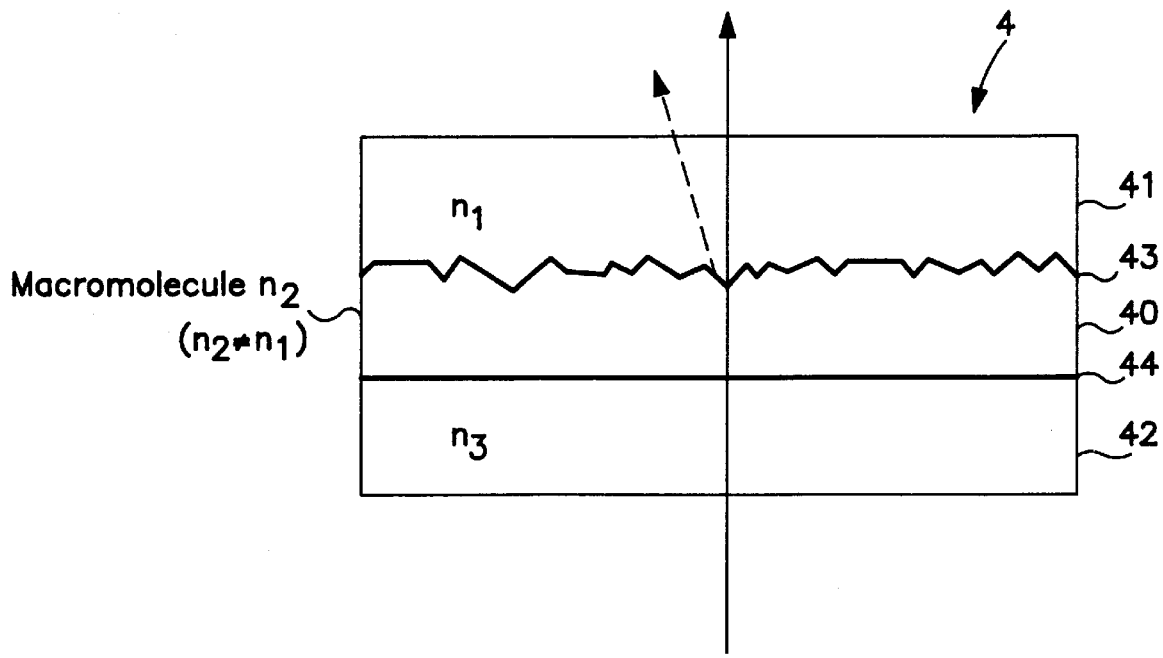
FIG. 2 is a cross-sectional diagram of the structure of the diffusion plate in accordance with the first embodiment of the present invention.

FIG. 2 is a schematic diagram illustrating the structure of the diffusion plate 4 in accordance with the first embodiment of the present invention. The diffusion plate 4 comprises a macromolecular dispersion type liquid crystal 40 interposed between a first transparent glass plate 41 and a second transparent glass plate 42. The surface of the first transparent glass plate 41 toward the macromolecular dispersion type liquid crystal 40 has a random roughness. A very thin transparent electrode layer 43 comprising indium tin oxide (ITO) is formed directly on the rough surface of the first transparent glass plate 41. Moreover, a surface of the second transparent glass plate 42 toward the macromolecular dispersion type liquid crystal 40 is a flat surface, and a very thin transparent electrode layer 44 comprising ITO is formed directly on the flat surface of the second transparent glass plate 42.

The macromolecular dispersion type liquid crystal 40 comprises a macromolecule—liquid crystal composite material in which nematic liquid crystal is dispersed in macromolecules. The diffusivity of the liquid crystal 40 is changed by changing the refractive index of the liquid crystal with an electrolytic effect. In accordance with embodiments of the present invention, the macromolecular dispersion type liquid crystal 40 is in a clouded state when an electric field is not applied, and exhibits high transparency to light when an electric field is applied.

Moreover, there is a predetermined difference between the refractive index ($n_1$) of the first transparent glass plate 41 and the refractive index ($n_2$) of the macromolecules which comprise the macromolecular dispersion type liquid crystal 40, and refraction occurs at the interface of the macromolecular dispersion type liquid crystal 40 and the first transparent glass plate 41. Because random roughness is formed in the surface of the first transparent glass plate 41, random refraction, specifically diffusion, arises when light is incident on the first transparent glass plate 41 from the macromolecular dispersion type liquid crystal 40.

The manufacture of the diffusion plate 4 shown in FIG. 2 will now be described hereinbelow. Firstly, a plane parallel glass plate comprising material of the first transparent glass plate 41 is prepared, and a process is performed to form a random roughness on the surface of the first transparent glass plate 41 toward the macromolecular dispersion type liquid crystal 40. The roughened surface of the first transparent glass plate 41 is obtained by sandblasting or like processes of roughness formation on the surface of the plane parallel glass plate. Alternatively, instead of the first transparent glass plate 41, a plate formed using injection molding of plastics and like thermosetting resin materials can also be used. In this case, by forming the necessary roughness on the mold beforehand, an appropriate random roughness distribution can be formed. In accordance with embodiments of the present invention, the roughness distribution is preferably one with a fixed controlled trend in period or vibration amplitude. Furthermore, when forming roughness in thermosetting resin materials, in order to prevent the formation of a coherent pattern on the diffusion plate 4, a roughness with no periodicity or regularity is desirable.

Next, the transparent electrode 43 is formed with ITO on the roughened surface of the first transparent glass plate 41. The second transparent glass plate 42 is then prepared comprising a plane parallel glass plate, and a transparent electrode 44 is formed with ITO on one side of the second transparent glass plate 42. Next, a bead comprising a spacer is suitably arranged on the transparent electrode 44 formed on the surface of the second transparent glass plate 42, making the transparent electrode surface 43 the lower side. The peripheries of the two glass plates 41, 42 are fixed with adhesive or the like interposed on the first glass plate 41. The space interposed between the two glass plates 41, 42 is then evacuated from a liquid crystal inlet aperture, and after a mixture of liquid crystal and monomer is injected into this space, a network of macromolecules is formed by ultraviolet radiation. Accordingly, the diffusion plate 4 as shown in FIG. 2 is completed.

The operation of the diffusion plate 4 shown in FIG. 2 will now be described hereinbelow. When a voltage is not being applied to the diffusion plate 4 (i.e., when non-driving), light from below, which is perpendicularly incident on the flat surface of the second transparent glass plate 42, passes through the second transparent glass plate 42, is incident on the macromolecular dispersion type liquid crystal 40, and is scattered there. Moreover, when the light passing through the macromolecular dispersion type liquid crystal 40 is incident on the first glass plate 41, scattering, corresponding to the configuration of the roughness, occurs as a result of refraction. Therefore, when the blurring angle with respect to the incident light is large, the diffusion coefficient can be made about zero (0), and the diffusion characteristics of the diffusion plate 4 are suitable. Furthermore, when voltage is applied to the diffusion plate 4 (i.e., when driving), light which is perpendicularly incident from below on the flat surface of the diffusion plate 4 is practically not scattered by the macromolecular dispersion type liquid crystal 40. The light passing through the macromolecular dispersion type liquid crystal 40 and incident on the first glass plate 41 is chiefly diffused by the surface roughness.

Figure 3:
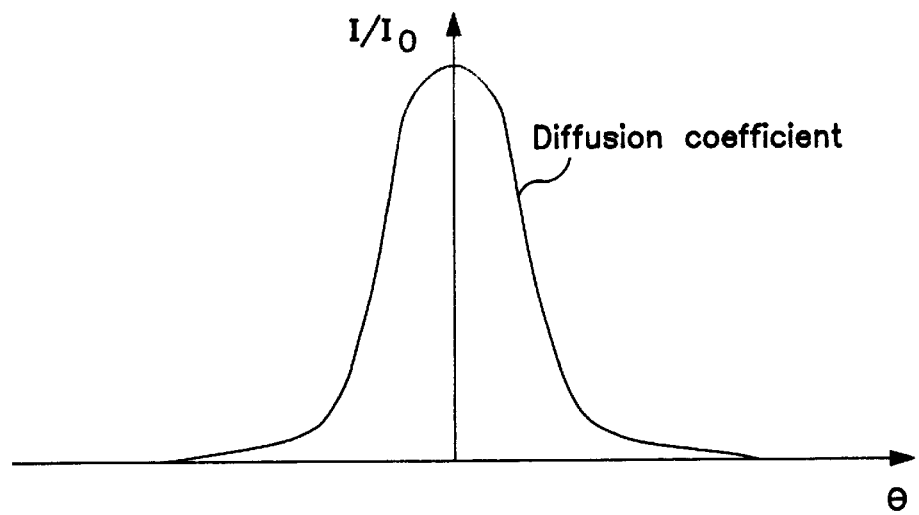
FIG. 3 is a graph illustrating the refractive index of the diffusion plate of FIG. 2 in accordance with the first embodiment of the present invention.

FIG. 3 is a graph showing the diffusion coefficient in a non-driving state of the diffusion plate 4 shown in FIG. 2 in accordance with the first embodiment of the present invention. In FIG. 3, the abscissa represents the angle θ from the normal direction of the diffusion plate 4, and the ordinate, in the case of shining light perpendicularly on the diffusion plate 4, represents the relative intensity ($I/I_0$) of the light diffused in the direction θ. In accordance with embodiments of the present invention, in the diffusion plate 4, the diffusion coefficient in the region of large angles θ is about zero (0). More particularly, when the refractive index ($n_1$) of the material of the first glass plate 41 and the refractive index ($n_2$) of the macromolecules of the macromolecular dispersion type liquid crystal 40 are chosen to be different, the primary effect is that the diffusivity is small in directions at a large angle θ from the normal line direction of the diffusion plate 4.

Generally, an ideal diffusion for a diffusion plate 4 is a fixed diffusion intensity only in a predetermined angular region from the normal line, and a diffusion is preferred in which the diffusion intensity becomes zero (0) in an angular region greater than in the predetermined angular region. The diffusion characteristics shown in FIG. 3 become quite close to the ideal diffusion characteristics. In a diffusion plate 4 having the above-described kinds of diffusion characteristics, when the image projected onto the diffusion plate 4 is indistinct, uniformly diffused image can be obtained which shows the effects of this indistinctness.

As an alternative embodiment of the present invention, a reverse type of macromolecular dispersion type liquid crystal can be used instead of the macromolecular dispersion type liquid crystal 40. The reverse type macromolecular dispersion type crystal is transparent when no voltage is applied to the diffusion plate 4 (non-driving), and becomes cloudy when voltage is applied to the diffusion plate 4 (driving). In accordance with the alternative embodiment, during the AF operation of the single lens reflex camera shown in FIG. 1, when no voltage is applied to the diffusion plate the diffusion plate 4 is made quite transparent, and the picture plane is made clear. Moreover, during manual operation, by applying a voltage to the diffusion plate 4, the diffusion plate 4 becomes cloudy and the peak of the focus is made easy to detect. When a camera using this diffusion plate is operated, because the times during which the diffusion plate 4 is made transparent are longer than the times during which the diffusion plate 4 is made cloudy, the power consumption of the diffusion plate 4 becomes small.

Second Preferred Embodiment

Figure 4:
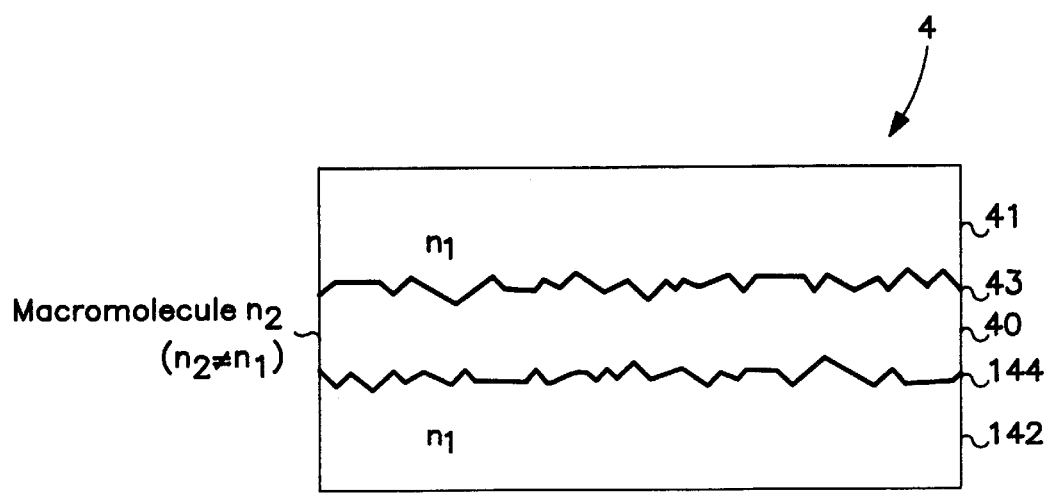
FIG. 4 is a cross-sectional diagram of the structure of a diffusion plate in accordance with a second embodiment of the present invention.

FIG. 4 is a schematic diagram of the structure of a diffusion plate 4 in accordance with a second embodiment of the present invention. The diffusion plate 4 in accordance with the second embodiment of the present invention is a modification of the first embodiment, and the same or similar elements in the second embodiment are referred to by the same reference symbols used in the first embodiment, and duplicate descriptions are omitted.

As shown in FIG. 4, the diffusion plate 4 has random roughness in the surfaces of the first transparent glass plate 41 and a second transparent glass plate 142 toward both sides of the macromolecular dispersion type liquid crystal 40. Respective transparent electrode layers 43, 144 are formed directly on the two glass plates 41, 142. Furthermore, the respective refractive indexes ($n_1$) of the glass plates 41, 142 are different from the refractive index ($n_2$) of the macromolecules comprising the macromolecular dispersion type liquid crystal 40.

The manufacture of the diffusion plate 4 shown in FIG. 4 will now be described hereinbelow. Firstly, a pair of plane parallel glass plates are prepared, comprising material of the first and second glass plates 41, 142, and a random roughness is formed on the respective surfaces which are toward the macromolecular dispersion type liquid crystal 40. Next, transparent electrode layers 43, 143 are formed on the rough surfaces of the two glass plates 41, 142. A bead is then arranged between the two glass plates 41, 142, and the peripheries of the glass plates 41, 142 are fixed with adhesive or the like. After this, a mixture of liquid crystal and monomer is injected into a space between the glass plates 41, 142, and a network of macromolecules is formed by ultraviolet radiation.

In accordance with the second embodiment of the invention shown in FIG. 4, the diffusion in the macromolecular dispersion type liquid crystal 40 and the diffusion at the interface with the two glass plates 41, 142 act additively, and the effect that the diffusivity is small in the direction at a large angle θ from the normal line to the diffusion plate 4 becomes even greater.

Third Preferred Embodiment

Figure 5:
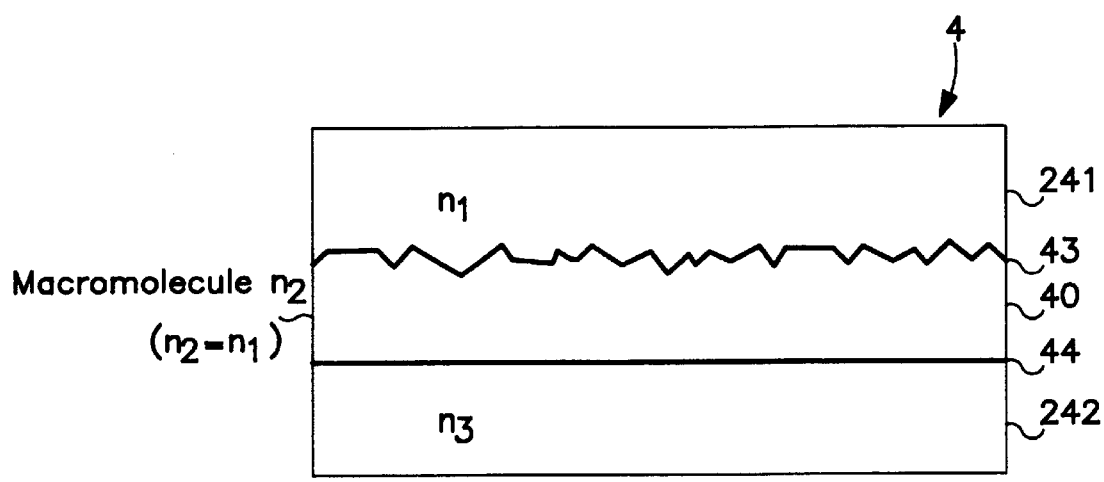
FIG. 5 is a cross-sectional diagram of the structure of a diffusion plate in accordance with a third embodiment of the present invention.
Figure 6:
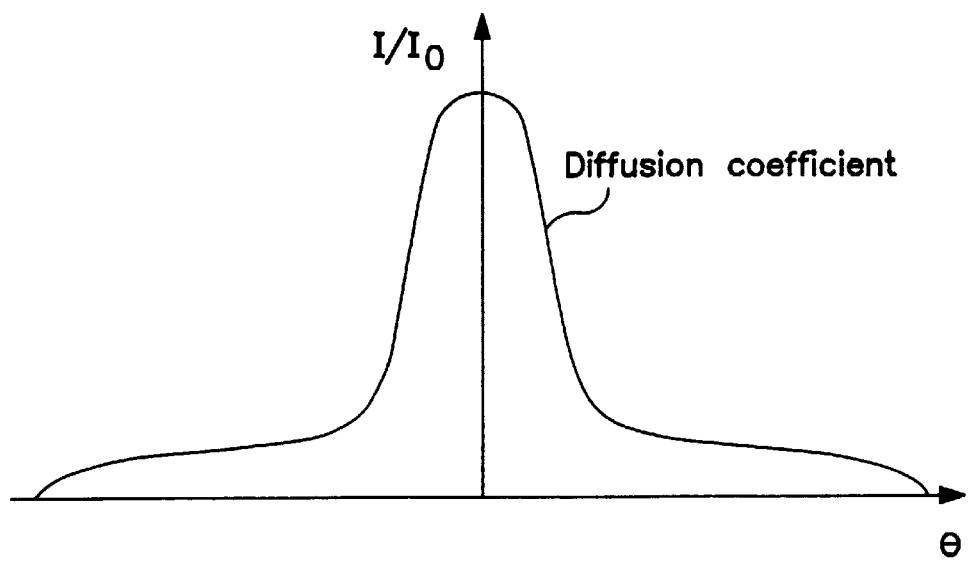
FIG. 6 is a graph illustrating the refractive index of a prior art diffusion plate.

FIG. 5 is a schematic diagram illustrating the structure of a diffusion plate in accordance with a third embodiment of the present invention. The diffusion plate 4 in accordance with the third embodiment of the present invention is a modification of the first embodiment, and the same or similar elements in the third embodiment are referred to by the same reference symbols used in the first embodiment of the invention, and duplicate descriptions are emitted.

In accordance with the third embodiment of the present invention shown in FIG. 5, the refractive index ($n_1$) of the material of at least one of first and second glass plates 241, 242 between which the macromolecular dispersion type liquid crystal 40 is interposed, and the refractive index ($n_2$) of the macromolecules which comprise the macromolecular dispersion type liquid crystal 40, are about equal. In FIG. 5, the refractive index ($n_1$) of the first glass plate 241 is equal to the refractive index ($n_2$). Furthermore, the diffusion plate 4 in accordance with the third embodiment of the invention also has random roughness formed on the surface of the first glass plate 241, before a transparent electrode layer 43 is formed on the surface of the first glass plate 241.

In accordance with the third embodiment of the present invention, during the non-driving time (i.e., the time when the macromolecular dispersion type liquid crystal 40 is in the diffusing state), the diffusivity is increased over that of the prior art diffusion plate by the synergistic effect of the diffusion arising at the interface of the glass plate and the macromolecules which comprise the macromolecular dispersion type liquid crystal 40, and of the diffusion (diffusion arising from roughness configuration) originating in the distribution of the macromolecules introduced into the roughness of the surface of the first glass plate 241.

Moreover, during the driving time (when the macromolecular dispersion type liquid crystal 40 is in a transparent state) there is no difference in refractive index between the first glass plate 241 and the macromolecular dispersion type liquid crystal 40. Accordingly, diffusion because of the roughness of the surface of the first glass plate 241 does not occur, and there is no fall of transmissivity in comparison with the prior art diffusion plate. More particularly, in comparison with the prior art, because the diffusivity in the diffusing state is increased and the transmissivity in the transmitting state is unchanged, the contrast becomes high. Further, in accordance with the embodiments of the present invention, the diffusion plate 4 is driven with a lower voltage in order to obtain a diffusivity similar to the prior art in the diffusion plate 4.

Embodiments of the invention have been described hereinabove with respect to the roughness of the glass plates being randomly formed. However, the present invention is not limited to randomly formed roughness on the glass plates. For example, the spacing of the roughness may be regulated according to Equation 1 below.

$$\theta = \lambda \qquad \text{Equation 1}$$

where d is the spacing of the roughness, θ is the angle from the normal line direction of the diffusing plate 4, and λ is the wavelength of the incident light.

When a range which is well seen with the loupe 5 is referred to as the angle θ, and is about 0–5°, and moreover, because the wavelength λ of the visible light is about 400–700 nm, the spacing d of the roughness is determined from Equation 1 to be 10–30 μm. Accordingly, roughness having a spacing of 10–30 μm may be formed in the glass plate.

Embodiments of the present invention have been described hereinabove with respect to the diffusion state when not driving (when no current is applied), and the transparent state when driving (when current flows). However, embodiments of the present invention are alternatively applicable to the case in which the above-described macromolecular dispersion type liquid crystal 40 becomes transparent when no current flows, and to the case in which a reverse type of macromolecular dispersion type liquid crystal is used which enters the diffusing state when current flows. In this case, the refractive index of the glass plate 241 having roughness may become equal to the refractive index of the macromolecules comprising the macromolecular dispersion type liquid crystal 40. Accordingly, the diffusion plate 4 becomes transparent because the difference in the refractive index between the macromolecules of the macromolecular dispersion type liquid crystal 40 and the glass plate 241 disappears.

In accordance with preferred embodiments of the present invention, when current flows, diffusion arises at the interface of the liquid crystal comprising the macromolecular dispersion type liquid crystal 40 and the macromolecules by the synergistic effect of the diffusion originating in the roughness of the first glass plate 241, and a high diffusivity can be obtained. In particular, in accordance with embodiments of the present invention, the reverse macromolecular dispersion type liquid crystal is beneficial in that, as described hereinabove, the driving voltage is low. In contrast, the prior art driving voltage is high and the power consumption is large.

Furthermore, embodiments of the present invention are described hereinabove in which a roughening treatment is performed on one of the two glass plates 241, 242. However, in a manner similar to that shown in FIG. 4, a roughening treatment may be performed on both of the glass plates 241, 242. In this case, the diffusing effect is further increased by further increasing the roughness interface.

The present invention is not limited to the embodiments described hereinabove. For example, the liquid crystal element having the structure shown in FIG. 2 can be used in devices other than in a diffusion plate. For example, the liquid crystal element can be suitably used in a cover glass of a clock.

In accordance with embodiments of the present invention, when the refractive index of the liquid crystal which comprises the macromolecular dispersion type liquid crystal has a different value from the refractive index of macromolecules in a predetermined electric field state, diffusion arises at the interface of the macromolecules and the liquid crystal. Moreover, even when the value of the refractive index of the liquid crystal in the macromolecular dispersion type liquid crystal portion which entered into the concave portions of the roughness becomes different from the refractive index of the transparent plate due to changes of the voltage state in the electric field state, diffusion arises corresponding to the state of roughness. As a result, it is possible to diversely regulate the diffusion characteristics of the liquid crystal element.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A liquid crystal element, comprising:
    a macromolecular dispersion type liquid crystal; and
    transparent plates between which the macromolecular dispersion type liquid crystal is interposed,
    wherein at least one of the transparent plates has roughness toward the macromolecular dispersion type liquid crystal.

2. A liquid crystal element as recited in claim 1, wherein the refractive index of the transparent plate having roughness differs from the refractive index of the macromolecules comprising the macromolecular dispersion type liquid crystal.

3. A liquid crystal element as recited in claim 1, wherein the refractive index of the transparent plate having roughness is approximately equal to the refractive index of the macromolecules comprising the macromolecular dispersion type liquid crystal.

4. A liquid crystal element as recited in claim 2, wherein the macromolecular dispersion type liquid crystal is a reverse type macromolecular dispersion type liquid crystal.

5. A liquid crystal element as recited in claim 3, wherein the dispersion type liquid crystal is a reverse type macromolecular dispersion type liquid crystal.

6. A liquid crystal element as recited in claim 1, wherein the spacing of the roughness is 10–30 $\mu$m.

7. A liquid crystal element as recited in claim 2, wherein the spacing of the roughness is 10–30 $\mu$m.

8. A liquid crystal element as recited in claim 3, wherein the spacing of the roughness is 10–30 $\mu$m.

9. A diffusion plate, comprising:
    a first transparent plate having a roughened surface;
    a second transparent plate;
    a macromolecular dispersion type liquid crystal interposed between the first transparent plate and the second transparent plate,
    wherein the roughened surface of the first transparent plate contacts the macromolecular dispersion type liquid crystal.

10. A diffusion plate as recited in claim 9, wherein the second transparent plate has a roughened surface contacting the macromolecular dispersion type liquid crystal.

11. A diffusion plate as recited in claim 9, wherein the macromolecular dispersion type liquid crystal comprises a macromolecule-liquid crystal composite material in which nematic liquid crystal is dispersed in macromolecules.

12. A diffusion plate as recited in claim 9, wherein the first transparent plate and the second transparent plate are respectively formed of glass.

13. A diffusion plate as recited in claim 9, wherein the first transparent plate and the second transparent plate are respectively formed of plastic.

14. A diffusion plate as recited in claim 9, further comprising:
    a first transparent electrode layer formed on the roughened surface of the first transparent plate; and
    a second transparent electrode layer formed on a surface of the second glass plate between the second glass plate and the macromolecular dispersion type liquid crystal.

15. A diffusion plate as recited in claim 14, wherein the first and second transparent electrode layers respectively comprise indium tin oxide.

16. A diffusion plate as recited in claim 10, wherein the respective refractive indices of the first transparent plate and the second transparent plate are different from the refractive index of the macromolecules comprising the macromolecular dispersion type liquid crystal.

17. A method of forming a liquid crystal element, comprising the steps of:
    preparing a first transparent plate;
    roughening a surface of the first transparent plate;
    forming a first transparent electrode on the roughened surface of the first transparent plate;
    preparing a second transparent plate;
    forming a transparent electrode on one side of the second transparent plate;
    inserting a spacer between the first and second transparent plates;
    injecting a mixture of liquid crystal and monomer into a space between the first and second transparent plates; and
    exposing the mixture of liquid crystal and monomer to ultraviolet radiation to form a network of macromolecules.

18. A camera, comprising:
    a photographic lens to image a subject;
    a mirror to change a path of the image imaged by the photographic lens;
    a liquid crystal element to receive the image imaged by the photographic lens, the liquid crystal element including,
    a macromolecular dispersion type liquid crystal,
    transparent plates between which the macromolecular dispersion type liquid crystal is interposed,
    wherein at least one of the transparent plates has roughness toward the macromolecular dispersion type liquid crystal.

19. A liquid crystal element, comprising:
    a first transparent glass plate;
    a first electrode layer formed on the first transparent glass plate;
    a macromolecular dispersion type liquid crystal formed on the first electrode layer;
    a second electrode layer formed a side of the macromolecular dispersion type liquid crystal opposite the first electrode layer;
    a second transparent plate formed on the second electrode layer, between which the macromolecular dispersion type liquid crystal is interposed,
    wherein at least one of the transparent plates has roughness toward the macromolecular dispersion type liquid crystal.

20. A liquid crystal element, comprising:

a first transparent plate;

a second transparent plate; and a macromolecular dispersion type liquid crystal interposed between the first and second transparent plates, wherein at least one of the transparent plates has roughness on a surface toward the macromolecular dispersion type liquid crystal, and wherein light is directly incident on the first transparent plate, passes through the first transparent plate directly to the macromolecular dispersion type liquid crystal, passes through the macromolecular dispersion type liquid crystal directly to the second transparent plate, passes through the second transparent plate and exits the liquid crystal element from the second transparent plate.

* * * * *